(12) United States Patent
De Cillia et al.

(10) Patent No.: US 9,217,585 B2
(45) Date of Patent: Dec. 22, 2015

(54) MOVEMENT MECHANISM AND SOLAR PLANT USING SAID MECHANISM

(75) Inventors: Luigi De Cillia, Mereto di Tomba (IT); Giordano Duri', Mereto di Tomba (IT); Gianfranco Zuliani, Basiliano (IT)

(73) Assignee: D.D. SRL, Mereto di Tomba (IT)

( * ) Notice: Subject to any disclaimer, the term of this patent is extended or adjusted under 35 U.S.C. 154(b) by 773 days.

(21) Appl. No.: 13/499,880

(22) PCT Filed: Aug. 27, 2010

(86) PCT No.: PCT/EP2010/062526
§ 371 (c)(1),
(2), (4) Date: Apr. 2, 2012

(87) PCT Pub. No.: WO2011/039011
PCT Pub. Date: Apr. 7, 2011

(65) Prior Publication Data
US 2012/0192666 A1    Aug. 2, 2012

(30) Foreign Application Priority Data

Oct. 2, 2009  (IT) .............................. UD2009A0173

(51) Int. Cl.
*F16H 55/18*    (2006.01)
*F24J 2/54*    (2006.01)
*F24J 2/46*    (2006.01)

(52) U.S. Cl.
CPC .............. *F24J 2/5403* (2013.01); *F24J 2/4638* (2013.01); *F24J 2002/5462* (2013.01); *Y02E 10/47* (2013.01); *Y10T 74/19623* (2015.01)

(58) Field of Classification Search
CPC ........... F24J 2/4638; F24J 2/5269; F24J 2/54; F24J 2/5403; F24J 2/5413; F24J 2002/5437; F24J 2002/5444; F24J 2002/5448; F24J 2002/5458; F24J 2002/5462; F24J 2002/5465; F24J 2002/5468; F24J 2002/5472; F24J 2002/5475; F24J 2002/5479; F24J 2002/5482; F24J 2002/5486; F16H 55/18
USPC ............ 74/406, 409, 416; 126/571, 572, 573, 126/576, 577, 600–608; 136/243
See application file for complete search history.

(56) References Cited

U.S. PATENT DOCUMENTS 2,933,938 A * 4/1960 Glaser .......................... 74/425.5
3,690,194 A * 9/1972 Edwards ......................... 74/427
3,848,477 A 11/1974 Giandinoto et al.

(Continued)

FOREIGN PATENT DOCUMENTS

DE    20 2004 016 412 U1    1/2005
EP    0 492 195 A1    7/1992

(Continued)

OTHER PUBLICATIONS

International Search Report and Written Opinion for PCT/EP2010/062526 mailed Mar. 29, 2011.

*Primary Examiner* — Gregory Huson
*Assistant Examiner* — Nikhil Mashruwala
(74) *Attorney, Agent, or Firm* — Flaster/Greenberg, PC

(57) ABSTRACT

A movement mechanism for moving an interception element of a solar plant. The mechanism is mounted on a support frame and is constrained to the interception element to allow the movement thereof with respect to the support frame. The mechanism comprises a drive member which generates a motion, and a transmission kinematism which transmits the motion to a rotation shaft constrained to the interception element. The transmission kinematism comprises a first mechanical member with gears mounted rotatable on a first support and mechanically connected to the drive member, and a second mechanical member with gears engaged on the first mechanical member, mounted on a second support, and keyed to the rotation shaft. The first and the second support are pivoted to each other with respect to a determinate pivoting axis, in order to rotate around the pivoting axis, so as to bring together/distance the first and the second mechanical member.

15 Claims, 3 Drawing Sheets

(56) References Cited

U.S. PATENT DOCUMENTS

| | | | |
|---|---|---|---|
| 4,135,493 A * | 1/1979 | Kennedy | 126/577 |
| 4,628,142 A * | 12/1986 | Hashizume | 136/246 |
| 8,459,249 B2 * | 6/2013 | Corio | 126/600 |
| 2014/0014159 A1 * | 1/2014 | Polk | 136/246 |

FOREIGN PATENT DOCUMENTS

| | | |
|---|---|---|
| EP | 1 791 184 A1 | 5/2007 |
| FR | 2 622 945 A1 | 5/1989 |
| GB | 891259 | 3/1962 |
| JP | 63 191549 A | 8/1988 |

* cited by examiner

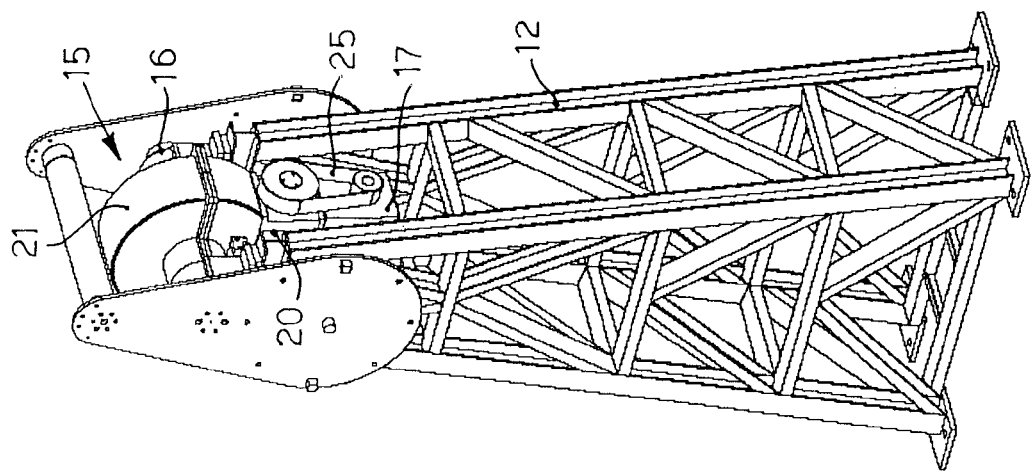
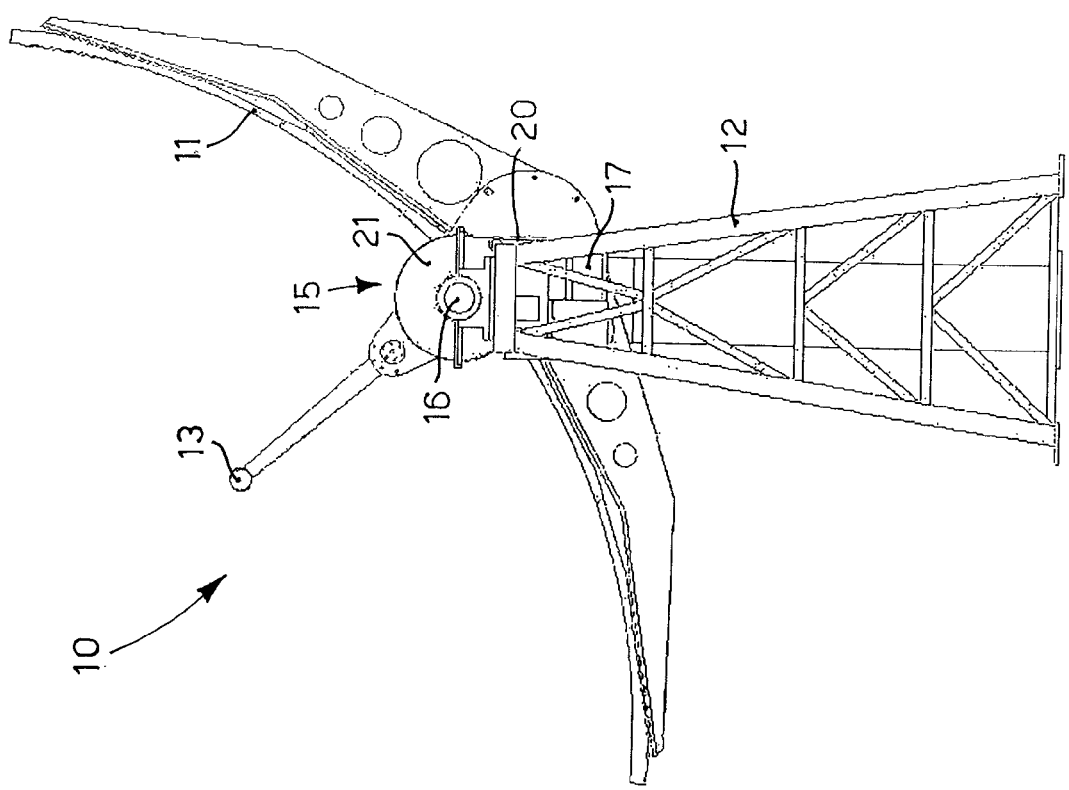

MOVEMENT MECHANISM AND SOLAR PLANT USING SAID MECHANISM

BACKGROUND OF THE INVENTION

1. Field of the Invention

The present invention concerns a mechanism for moving one or more interception elements suitable at least to intercept a light wave, sound wave, radio wave or other type of wave. In particular, the present invention is advantageously but not exclusively applied in a solar plant, for example of the concentration type, in which the interception elements are a plurality of reflective plates mounted mobile on a frame, so as to assume an optimized condition of exposure to the sun's rays and suitable to concentrate the sun's rays in suitable collectors, in order to exploit the solar energy.

The present invention also concerns the solar plant that uses the mechanism for moving the reflective plates.

2. Description of Related Art

Solar plants are known, in particular the concentration type, in which a plurality of reflective plates, or mirrors, are suitably conformed, normally concave, to intercept and concentrate the sun's rays toward a common collector in which a saline solution or other flows, to accumulate energy.

It is known that the saline solution is then used to transform the accumulated energy into usable energy, for example electric or heat energy or other.

Concentration type solar plants are also known, in which the reflective plates can be moved so as to be selectively oriented according to the azimuth angle of the sun, at least partly following its daily movement, and therefore optimizing to the utmost the exploitation of the available solar energy.

It is also known that this system of supporting and moving the plates used in solar plants is also used in other types of plants, for example photovoltaic plants, transceiver plants or others where it is necessary to orient a plurality of interception elements, whether they are photovoltaic panels, transceiver antennae or others.

It is known to provide, for all the above known types of plant, a rotatable assembly of each interception element to the frame by means of typical rotation mechanisms, such as bronzes, bearings or suchlike, and at least a movement mechanism suitable to command the rotation of the interception element.

The rotation required for this type of plant has an amplitude of some tens of degrees, that is, sufficient to follow the relative rotation of the sun throughout the day, and occurs at a very low speed, precisely depending on the relative movement of the sun.

These kinematic conditions require a great accuracy in the movement because even a deviation of one degree can considerably affect the energy performance, or generally the functional performance of the plant.

Therefore, in particular in solar plant applications, but not only, it is known to use movement mechanisms for example of the hydraulic or electronic type, or mechanical with levers, with linear guides or others, that guarantee an optimal precision in movement.

However, such mechanisms are extremely expensive to produce, to install and to maintain, and entail an overall increase in the running costs of the plant.

Furthermore, since they have to support considerable static loads and apply high torques in order to move the interception elements, the movement mechanisms normally used are often over-sized, which entails a further increase in costs.

The movement mechanisms normally do not include the gear kinematisms or suchlike, which, while transmitting high torques and having limited production, installation and maintenance costs, do not guarantee a sufficient precision of movement, mainly due to the normal plays in construction and meshing of the gears that transmit motion.

Moreover, since they have these construction plays, gear type kinematisms are normally excluded due to the possible accidental movements that can occur between the gears themselves.

Indeed, mainly due to atmospheric agents acting on the interception elements, for example because of the wind, the gears can move reciprocally and cause vibrations, with consequent possible breakages of the gears and of the interception elements.

It is known to provide, for example from the European patent application EP-A-1791184, a purely elastic system to compensate the construction and meshing plays between the transmission gears of the movement mechanism of the solar plant.

This solution, due to the mechanical nature of the elastic action, is sensitive to the vibrations that are generated due to the action of atmospheric agents on the interception element, and effects a constant and progressive thrust on the parts, keeping them engaged under pressure with each other.

These characteristics clearly determine an increase in the wear between the gears, and can possibly cause a breakage.

Moreover, by effecting a constant and progressive thrust, the elastic system does not allow to verify from outside the state of wear of the gears, so that they can only be replaced or maintained when a mechanical problem occurs, with no possibility of programming.

Purpose of the present invention is to produce a movement mechanism, and perfect a solar plant, which are simple and economical to make, which allow an effective and precise movement of the interception elements, and which overcome the shortcomings of known solutions.

The Applicant has devised, tested and embodied the present invention to overcome the shortcomings of the state of the art and to obtain these and other purposes and advantages.

BRIEF SUMMARY OF THE INVENTION

The present invention is set forth and characterized in the independent claims, while the dependent claims describe other characteristics of the invention or variants to the main inventive idea.

In accordance with the above purpose, a movement mechanism according to the present invention is applied to move at least one interception element, advantageously but not only in a solar plant, for example of the concentration type, which plant comprises, apart from the interception element, a support frame on which the interception element is mounted mobile so as to assume an optimized interception condition, for example for exposure to the sun's rays.

The movement mechanism according to the present invention is mounted on the support structure and is constrained to one or more interception elements by means of a rotation shaft, to allow movement thereof with respect to the frame.

The movement mechanism also comprises a drive member able to transmit a determinate motion to the rotation shaft by means of a gear type transmission kinematism, for example a worm screw.

According to a characteristic feature of the present invention, the transmission kinematism comprises a first mechanical member with gears, mounted rotatable on a relative first support and mechanically connected to the drive member, and a second mechanical member with gears engaged with the first mechanical member with gears, mounted rotatable on a second support and keyed to the rotation shaft.

Moreover, the first support and the second support are pivoted to each other with respect to a determinate pivoting axis, so as to be able to be relatively rotated around said axis and to bring together/distance the first mechanical member with gears and the second mechanical member with gears.

In particular, the approach movement of the first mechanical member with gears with respect to the second mechanical member with gears allows to improve the meshing conditions between the two mechanical members, substantially cancelling the normal construction and meshing plays.

In this way, by keeping the two supports, and therefore the relative mechanical members with gears, in a condition of proximity, the transmission kinematism is able to transmit with great precision to the rotation shaft the movement imparted by the drive member.

Therefore, with the present invention, using a simple, economical mechanism able to transmit high torques without oversizing, it is possible to move the interception elements precisely and effectively, limiting to a minimum, if not eliminating entirely, the risk of generating vibrations with possible breakage of the mechanical members and/or the interception elements.

Advantageously, the movement mechanism comprises at least a thrust element, disposed in cooperation at least with one of either the first support or the second support, and so as to generate a thrusting action of the relative first or second support toward the opposite second or first support, and keep them in a condition of proximity.

The thrust element thus allows to keep the two mechanical members constantly in the reciprocally engaged condition substantially without any play.

In this way, the invention guarantees that precision is maintained in moving the interception elements with respect to the frame.

According to a variant, elastic means are provided, operatively associated with the thrust element so as to thrust it elastically into cooperation with the first support or the second support, so as to generate an elastic return toward the opposite second support, or first support.

This variant solution allows a substantially constant compensation of the plays between the two mechanical members, also when there is wear due to rubbing between them.

According to the invention, the thrust element is conformed substantially as a wedge and is disposed in cooperation with a relative pin, constrained to the relative first or second support.

In this condition, the action of the wedge generates a thrust on the pin, determining the action of bringing the two mechanical members into proximity.

In particular, the wedge-shaped thrust element, exploiting its inclination and the relative breakdown of the loads, allows to determine a release torque that is greater than the preloading of the elastic means, so as to have a prevailing action over the latter, both in a condition of compensation and also in a condition where the position reached is maintained.

In this way, when the wedge-shaped thrust element is subjected to a nominal load action by the mechanical members, it maintains the position reached, substantially cancelling the action of the elastic means; on the contrary, when the nominal load of the mechanical members is reduced or eliminated due to the effect of the operating conditions of the plant, the wedge-shaped thrust element advances under the action of the elastic means, compensating the plays between the mechanical members.

Therefore, with the solution according to the present invention, once the meshing plays between the mechanical members have been compensated, the position reached by the wedge-shaped thrust element is maintained without exerting progressive pressures on the kinematically operative parts.

Consequently, the plays can be progressively compensated, but without exerting constant pressures on the mechanical members, as happens instead in known solutions with purely elastic systems.

Furthermore, the wedge-shaped thrust element, due to its very nature, has a substantially rigid coupling and is not sensitive to vibrations, compared with purely elastic solutions, thus safeguarding the kinematically operative parts from this effect.

Another advantage of the solution according to the present invention is that it is possible to make an effective and precise control of the wear on the mechanical members, since the wedge, moving and maintaining the position reached, allows its travel to be measured and therefore it is possible to calculate the wear and the mechanical state of the mechanical members.

This advantage allows to program possible interventions for maintenance and/or replacement of the parts, without waiting for mechanical problems to occur.

According to a variant, the wedge-shaped thrust element is disposed on one side in cooperation with the pin and, on the other side, resting on a relative contrasting surface.

The contrasting surface is comprised on the support opposite the one on which the pin is constrained.

According to another variant, the first mechanical member is a screw gear and the second mechanical members is a toothed wheel engaging with the screw gear, so as to define a kinematism known as "worm gear".

In this variant solution, the first support on which the worm screw is mounted rotatable, can be rotated with respect to the second support around the pivoting axis, whereas the second support on which the toothed wheel is mounted rotatable is fixed.

BRIEF DESCRIPTION OF THE SEVERAL VIEWS OF THE DRAWINGS

These and other characteristics of the present invention will become apparent from the following description of a preferential form of embodiment, given as a non-restrictive example with reference to the attached drawings wherein:

FIG. 1 is a schematic lateral view of a portion of a concentration type solar plant according to the present invention;

FIG. 2 is a partial three-dimensional view of a detail of FIG. 1;

DETAILED DESCRIPTION OF THE INVENTION

Figure 3:
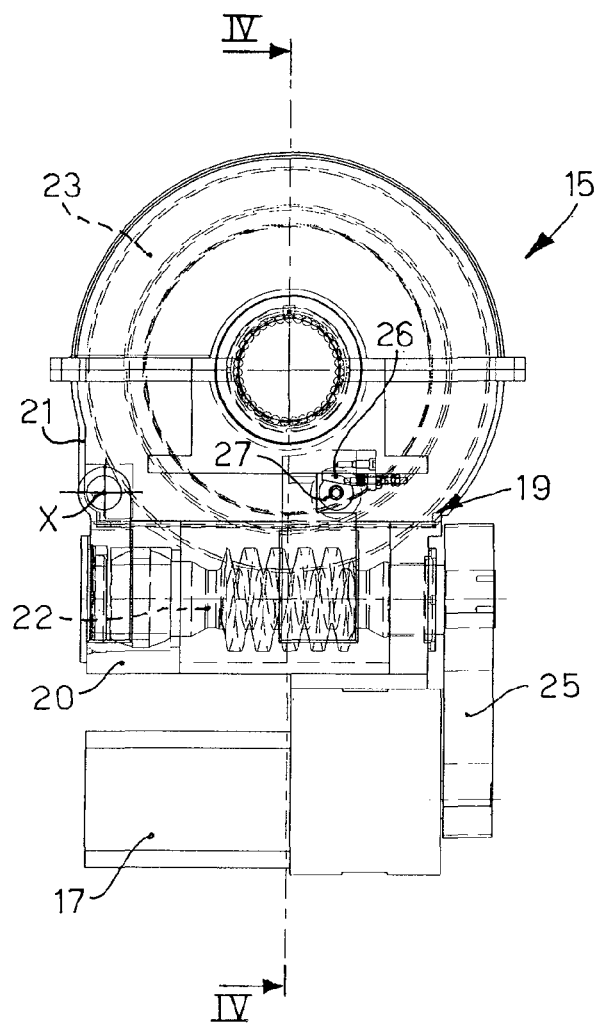
FIG. 3 is a lateral view of a movement mechanism according to the present invention applied to the plant in FIG. 1.
Figure 4:
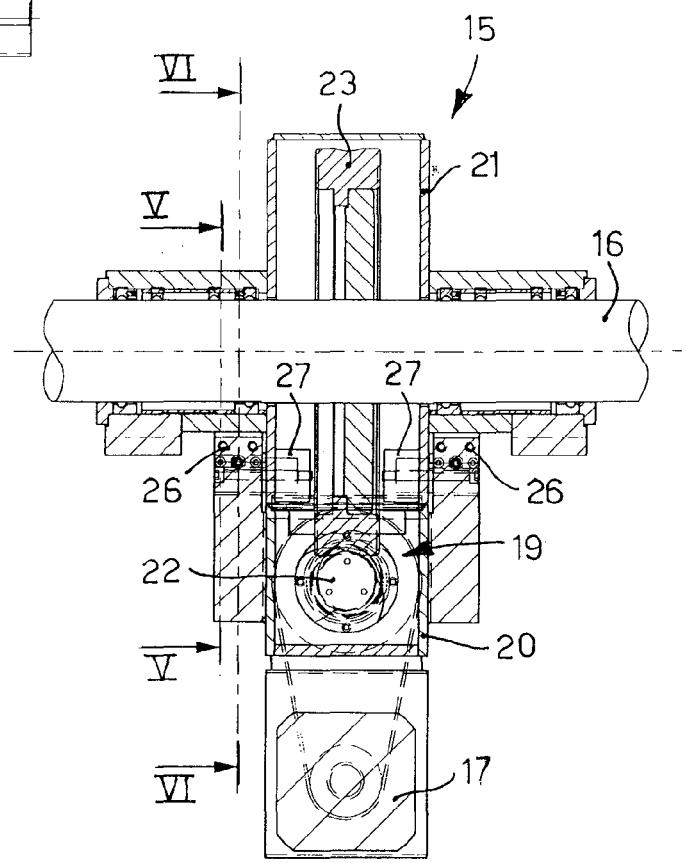
FIG. 4 shows a section from IV to IV of FIG. 3.
Figure 5:
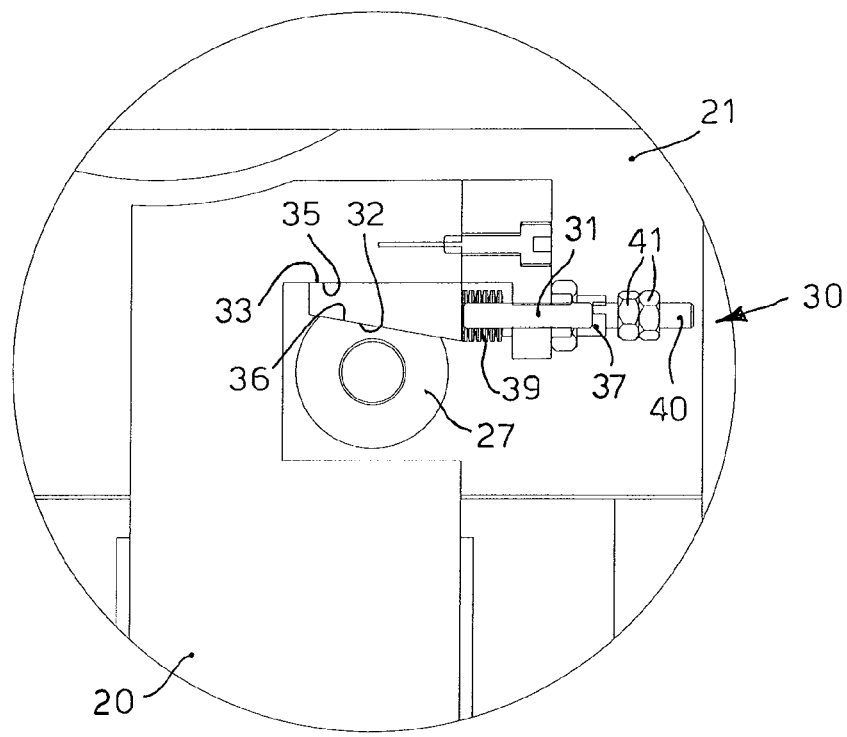
FIG. 5 shows a section from V to V of FIG. 4.
Figure 6:
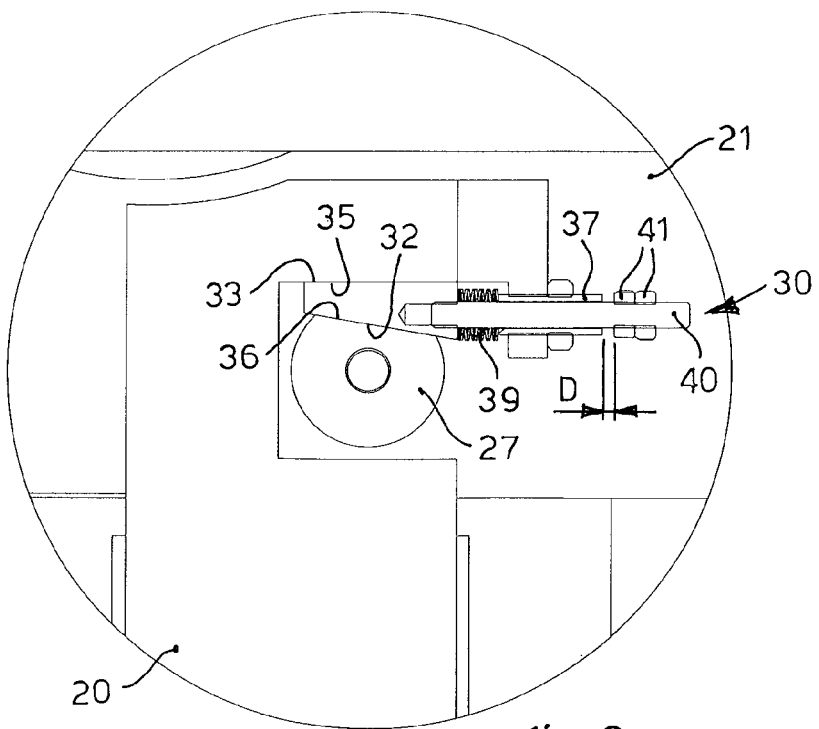
FIG. 6 shows a section from VI to VI of FIG. 4.

With reference to the attached drawings, a solar plant 10 according to the present invention is in this case of the concentration type, that is, one where the sun's rays are concentrated in suitable collectors 13 inside which a saline solution flows and which functions as an energy accumulator. The energy thus accumulated is then transformed into usable energy, such as electric energy, heat energy or other.

In particular, the solar pant 10 according to the present invention comprises a plurality of reflective plates 11 and a support frame 12 on which the reflection plates 11 are mounted mobile, in a desired order.

The solar plant 10 also comprises a plurality of movement mechanisms 15 suitable to selectively move the reflective plates 11, individually or in groups, with respect to the support frame 12.

Each reflective plate 11 substantially consists of one or more mirrors disposed reciprocally to define a structure conformed substantially concave so as to reflect the sun's rays toward the collector 13.

Advantageously, the collector 13 is positioned in correspondence with the focus point defined by the mirror or mirrors which make up the reflective plate 11.

Each movement mechanism 15 is mounted on the frame 12 and is constrained to one or more reflective plates 11 by means of a rotation shaft 16.

Each movement mechanism 15 comprises a movement motor 17, a first support 20, a second support 21 and a transmission kinematism 19, the latter able to receive motion from the movement motor 17 and to transmit it with a desired transmission ratio to the rotation shaft 16.

The first support 20 and the second support 21 are pivoted to each other with respect to a pivoting axis "X", so that they can be reciprocally moved with respect to each other, and are conformed to support inside them the transmission kinematism 19.

In this case, the first support 20 can rotate with respect to the second support 21 around the pivoting axis "X", while the second support 21 is fixed to the frame 12.

In the solution shown in the attached drawings, the pivoting axis "X" is substantially parallel to the axis of rotation of the rotation shaft 16.

The transmission kinematism 19 comprises a screw type gear 22 engaging with a toothed wheel 23.

In particular, the screw type gear 22 is mounted rotatable on the first support 20 and is associated with the movement motor 17 by means of a belt transmission 25.

The toothed wheel 23, on the contrary, is mounted rotatable on the second support 21 and is keyed to the rotation shaft 16.

In this way, the motion generated by the movement motor 17 and transmitted by means of the belt transmission 25 to the screw type gear 22 is transmitted with a desired transmission ratio to the toothed wheel 23 and therefore to the rotation shaft 16.

The movement mechanism 15 also comprises two thrust wedges 26, disposed on opposite sides with respect to a common lying plane of the screw type gear 22 and the toothed wheel 23.

Each thrust wedge 26 is disposed in cooperation with a relative pin 27, to effect a thrusting action in this case on the first support 20, in order to keep it constantly thrusting against the second support 21.

In particular, the pin 27 is laterally constrained to the second support 21 on the side opposite the pivoting axis "X" with respect to the axis of rotation of the rotation shaft 16.

Each thrust wedge 26 is kept in cooperation with the pin 27 by means of relative elastic members 30.

Each thrust wedge 26 contacts, with a first inclined surface 32, the pin 27 so as to stop on it and impart the desired thrust on the first support 20, whereas with a second surface 33 it slides on a contrasting wall 35 of the first support 20.

In this case, the pin 27 is constrained rotatable axially on the second support 21 and comprises a facing 36 which contacts the first surface 32 of the wedge 26, optimizing the thrusting conditions imparted by the latter.

As an alternative to or in combination with the rotatable constraint of the pin 27, the invention provides that the first surface 32 of the wedge has a determinate rounded shape so as to define a punctual contact of the wedge 26 of the pin 27, thus optimizing the conditions of reciprocal cooperation.

Both these solutions also allow to angularly compensate the position of the pin 27 and the wedge 26, which position varies as a consequence of the variation in the angular position of the first and second support 20 and 21, in the step where the plays are compensated.

The elastic member 30 that acts on each thrust wedge 26 comprises a plurality of Belleville washers 39 able to exert an elastic thrust on the thrust wedge 26 toward the pin 27, and an adjustment screw 37 able to allow to adjust the Belleville washers 39 by a desired preload. In association with the elastic member 30 a control screw 40 is also provided, which is disposed coaxial and through with respect to the adjustment screw 37 and is screwed onto the thrust wedge 26. On the visible rear part of the control screw 40 two abutment nuts 41 are provided, the initial position of which is defined and clamped during the assembly of the wedge 26.

By measuring the distance D between the abutment nuts 41 and the head of the adjustment screw 37 it is possible to detect the movement of the thrust wedge 26 and therefore the entity of the play compensated, with consequent assessment of the state of wear of the screw 22 and the toothed wheel 23.

Adjustment members 31 are also provided, in this case two screws disposed symmetrical to the elastic member 30 and able to adjust the minimum position of the thrust wedge 26 and therefore the minimum play between the gears of the screw gear 22 and the toothed wheel 23.

It is clear, however, that modifications and/or additions of parts may be made to the solar plant 10 and the movement mechanism 15 as described heretofore, without departing from the field and scope of the present invention.

For example, it comes within the scope of the present invention to provide that an encoder, or other position transducer of a substantially known type, is operatively associated with the movement motor 17 in order to verify the rotation conditions of the rotation shaft 16.

It also comes within the scope of the present invention to provide a command and control unit, of a known type and not shown here, which is provided to coordinate in a desired manner the activation of the movement motor 17 with respect to the data detected by the encoder, and other functional parameters, such as for example the azimuth angle of the sun or others.

In a variant solution, in which the intensity of the thrust imparted by the thrust wedges 26 is commanded electronically instead of using the adjustment screws 37, the command and control unit can be disposed and programmed to vary the intensity of the thrust according to possible levels of error detected.

According to another variant, a dual solution is provided, in which the thrust wedge 26 is suitable to thrust the second support 21 toward the first support 20.

According to another variant, the pivoting axis "X" is disposed substantially perpendicular to the axis of rotation of the rotation shaft 16.

It is also clear that, although the present invention has been described with reference to specific examples, a person of skill in the art shall certainly be able to achieve many other equivalent forms of movement mechanism and solar plant using said mechanism, having the characteristics as set forth in the claims and hence all coming within the field of protection defined thereby.

We claim:

1. A movement mechanism for moving at least an interception element mounted mobile on a support frame, to assume an optimized interception condition, said movement mechanism being able to be mounted on said support frame and to be constrained to said interception element, to allow the movement thereof with respect to the support frame, and comprising a drive member able to generate a determinate motion, and a transmission kinematism able to transmit the motion generated by the drive member to a rotation shaft constrained to the interception element, wherein said transmission kinematism comprises a screw gear with gears mounted rotatable on a first support and mechanically connected to said drive member, and a toothed wheel with gears engaged on said screw gear, mounted rotatable on a second support, and keyed to said rotation shaft, the first support and the second support being pivoted to each other with respect to a determinate pivoting axis, to be able to be relatively rotated around said pivoting axis, so as to reciprocally bring together/distance the screw gear and the toothed wheel wherein said movement mechanism comprises at least a thrust wedge element, disposed in cooperation with a pin constrained to the second support or the first support by an elastic member able to act on said thrust wedge elements, so that the thrust wedge element is kept elastically in cooperation with the first support or the second support, so as to generate an elastic thrust action of the relative first support or second support toward the opposite second support or first support, and to maintain a condition of proximity between them, and wherein the thrust wedge element is disposed with a first inclined surface in cooperation with the pin so as to stop on said pin and impart the desired thrust on the support and with a second surface resting on a contrasting surface, the contrasting surface being a surface of the support opposite the one to which the pin is constrained.

2. The movement mechanism as in claim 1, wherein the first support on which the screw gear is rotatably mounted is rotatable around the pivoting axis with respect to the second support, whereas the second support on which the toothed wheel is mounted is fixed.

3. The movement mechanism as in claim 1, wherein the screw gear is mounted rotatable on the first support and is associated with the movement motor by means of a belt transmission and the toothed wheel is mounted rotatable on the second support and is keyed to the rotation shaft.

4. The movement mechanism as in claim 1 further comprising two thrust wedges disposed on opposite sides with respect to a common lying plane of the screw gear and the toothed wheel.

5. The movement mechanism as in claim 4, wherein the first inclined surface of each thrust wedge contacts the pin, whereas the second surface of each thrust wedge is slidable on the contrasting surface of the support opposite the one to which the pin is constrained.

6. The movement mechanism as in claim 1, wherein adjustment members are provided and said adjustment members are able to adjust the minimum position of the thrust wedge and therefore a minimum play between the gears of the screw gear and the toothed wheel.

7. The movement mechanism as in claim 1, wherein said pin is constrained rotatable axially on the second support and comprises a facing which contacts the first inclined surface of the wedge, optimizing thrusting conditions imparted by the thrust wedge.

8. The movement mechanism as in claim 1, wherein said elastic member able to act on said thrust wedge comprises a plurality of Belleville washers able to exert an elastic thrust on the thrust wedge toward the pin, and an adjustment screw able to allow adjustment of the Belleville washers by a desired preload.

9. The movement mechanism as in claim 8, wherein a control screw is also provided in association with the elastic member, wherein the control screw is disposed coaxially and through with respect to the adjustment screw and is screwed onto the thrust wedge.

10. The movement mechanism as in claim 9, wherein two abutment nuts are provided on a visible rear part of the control screw, and wherein an initial position of the two abutment nuts is defined and clamped during the assembly of the wedge.

11. The movement mechanism as in claim 10, wherein the distance between the abutment nuts and the head of the adjustment screw gives an indication of the movement of the thrust wedge and therefore an entity of play compensated, with consequent assessment of a state of wear of the screw and the toothed wheel.

12. The movement mechanism as in claim 2 further comprising two thrust wedges disposed on opposite sides with respect to a common lying plane of the screw gear and the toothed wheel.

13. The movement mechanism as in claim 3 further comprising two thrust wedges disposed on opposite sides with respect to a common lying plane of the screw gear and the toothed wheel.

14. The movement mechanism as in claim 3, wherein the first support on which the screw gear is rotatably mounted is rotatable around the pivoting axis with respect to the second support, whereas the second support on which the toothed wheel is mounted is fixed.

15. A solar plant comprising at least an interception element, a support frame on which said interception element is mounted mobile to assume an optimized interception condition, and at least a movement mechanism mounted on the support frame and constrained to said interception element, to allow the movement thereof with respect to the support frame, said movement mechanism comprising a drive member able to generate a determinate motion, and a transmission kinematism able to transmit the motion generated by the drive member to a rotation shaft constrained to the interception element, wherein said transmission kinematism comprises a screw gear with gears mounted rotatable on a first support and mechanically connected to said drive member, and a toothed wheel with gears engaged on said screw gear, mounted rotatable on a second support, and keyed to said rotation shaft, the first support and the second support being pivoted to each other with respect to a determinate pivoting axis, to be able to be relatively rotated around said pivoting axis, so as to reciprocally bring together/distance the screw gear and the toothed wheel, wherein said movement mechanism comprises at least a thrust element, disposed in cooperation with a pin constrained to the second support or the first support by an elastic member able to act on said thrust wedge element, so that the thrust wedge element is kept elastically in cooperation with the first support or the second support, so as to generate a thrust action of the first support or second support toward the opposite second support or first support, and to maintain a condition of proximity between them, and wherein the thrust wedge element is disposed with a first inclined surface in cooperation with the pin so as to stop on said pin and impart the desired thrust on the support and with a second surface resting on a contrasting surface, the contrasting surface being a surface of the support opposite the one to which the pin is constrained.

* * * * *